United States Patent Office 2,738,074
Patented Mar. 13, 1956

2,738,074

FILTER OF STARCH-RESIN IMPREGNATED WEBS OF LAMINATED CREPED PAPER

John E. Valente, Neenah, Wis., assignor, by mesne assignments, to Kimberly-Clark Corporation, a corporation of Delaware No Drawing. Application January 21, 1953, Serial No. 332,533

3 Claims. (Cl. 210—204)

The present invention relates to web products characterized by a high wet strength, flexibility, and porosity. The products of the present invention, because of these characteristics, are particularly useful in the manufacture of various types of filters, both for liquids and gases, for example, those used in the filtration of hot lubricating oils, and other fluids such as fuel oil and the like.

Many attempts have been made in the past to manufacture filter elements from paper, cotton, or other webs by impregnating such webs with a resin or an adhesive so as to improve the stability and durability of the filter element. One of the best filter elements of this type is described in the Catlin and Wollwage Patent 2,554,814. That patent describes a multi-ply filter element composed of a plurality of plies of wadding bonded together by means of a thermosetting resin such as a phenol-formaldehyde condensation product.

The present invention is directed to a filtering product, having filtering characteristics comparable to the aforementioned filter, but characterized by savings in the cost of manufacture by the use of binders of an entirely different character.

Among the objects of the present invention are the provision of an improved impregnated web particularly useful for the manufacture of filter elements, and the provision of an improved multi-ply filter made with an inexpensive impregnant.

In accordance with the present invention, a fibrous web, composed of paper, cotton, synthetic fibers, combinations of fibers, or the like, is impregnated with a reaction product of a carbamide-aldehyde resin and starch, and this reaction product is subsequently cured to produce a web whose porosity and other filtering characteristics as well as its flexibility make it an ideal filtering material for filtering petroleum products and the like.

The web to be impregnated is preferably a multi-ply layer of cellulose wadding. Where a rapid filtering rate is desired in the final product, each ply may be composed of wadding having a dryer basis weight of 8 to 10 pounds per standard ream of 480 sheets each 24 by 36 inches and a crepe ratio of about 2.0 to 3.0. Where an extremely rapid rate is desired, an open or lacy-like creped tissue having a dryer basis weight of 4 to 7 pounds per standard ream and a crepe ratio of 2.0 to 3.0 may be used.

It is normally desirable to employ at least three and five to eight plies of the wadding in order to obtain a satisfactory extraction ratio. Clearly, a filter sheet having the necessary number of individual plies can be made by using a single web each of whose plies is impregnated before or after assembly, or a plurality of webs each having a small number of webs can be combined into a composite web of the desired thickness.

As the resinous constituent in the starch-resin composition, I prefer to use a water soluble carbamide-aldehyde reaction product prepared by condensing amides or amines such as melamine, urea, thiourea, guanidine, dicyanidiamide, or the like, with an aldehyde or aldehyde-producing substance such as formaldehyde, paraformaldehyde, or hexamethylene tetramine.

As the starch constituent, I prefer to use a modified starch since unmodified starches tend to gel at the temperatures and concentrations I prefer to use in the reaction with the carbamide resin. By "modified starches" I mean starches which have been reacted with acids, oxidized, or modified by proteolytic or amyleolytic enzymes to produce dextrins or other polysaccharide products. Raw starches and chlorinated starches while useable in this process can be used only at low concentrations, to meet the viscosity requirements, so that the strength characteristics of the product are impaired. A starch, to produce the best products in this process, should have its gelling characteristics sufficiently altered so that it does not gel at the temperatures and concentrations used in the reaction with the resinous material.

There are several means for combining the starch and the resin as for example, cooking the starch and resin together, combining the resin into a hot, cooked starch solution, or impregnating the web with the cooked starch and then spraying on the resin onto the starch treated sheet.

The exact nature of the combination which takes place between the cooked starch and the resin is not clearly understood. It is evident, however, that some chemical reaction takes place because the starch after the reaction becomes insolubilized and very resistant to wetting. Apparently, the starch and the resin combine in very definite proportions, which in the case of a melamine-formaldehyde resin, occurs at about 6 parts by weight of the starch to one part by weight of the resin. For the purposes of this invention, I prefer to use from 3 to 8 parts of the modified starch for one part of the melamine resin.

The percentage of resin to be included in the web will depend upon the type of filtering element which is to be made from the material. Broadly, the range is from about 5 to about 40 per cent by weight. In the case of single ply filters, the usual content of starch-resin impregnant will be from 5 to 35 per cent by weight of the final product. In the case of multi-ply structures, the starch-resin content should be within the range of 10 to 40 per cent by weight of the product.

As an example of the preparation of the starch-resin impregnant, 1861 pounds of a starch solution containing 11.5 per cent by weight of a modified starch were prepared by cooking the starch-water mix at a temperature of 86° C. and allowing it to cool overnight in the kettle to 50° C. The resinous composition was prepared by adding a powdered melamine-formaldehyde resin (Parez resin 611) to a small amount of cold water and mixing. The solution produced contained 36 pounds of the resin in 73 pounds of cold water. The resin mix was then combined with the starch mix to produce an impregnating composition having a total solids content of 12.7 per cent.

Control of the viscosity of the impregnant is also important for best results. To avoid excessive plugging of the interstices of the web, the viscosity of the impregnant at the concentrations used for impregnation should be below 300 centipoises at the impregnating temperatures, and is preferably below 150 centipoises.

Sections of 6-ply wadding made up from plies having a dryer basis weight of about 6 pounds per ream of 2880 square feet and a crepe ratio of 2.85, were impregnated with the starch-resin mixture to provide in the laminated structure a starch-resin content of about 27.6 per cent by weight on a bone dry basis.

After impregnation with the resin-starch mixture, the wadding is preferably dried at conditions which remove much of the water present but do not suffice to cure the resin-starch composition to a significant degree. Good results are obtained if the impregnated wadding is dried with air at temperatures of 200° to 325° F., for a sufficient time to produce a sheet having a moisture content of 8 to 15% in the air dry condition. In the dried state, the impregnated wadding can be stored for indefinite periods without noticeable adverse effects, even at relatively warm temperatures. In contrast, wadding which has been impregnated with thermosetting resins alone, without starch, sometimes becomes brittle and stiff at extended exposure to temperatures only slightly above room temperature.

When the dried wadding is ready to be made into the filter elements, it may be desirable to soften the wadding by steaming to increase its flexibility for subsequent manufacturing operations. The resin-starch impregnated plies are particularly amenable to steaming because they become quite flexible with the addition of a small amount of steam so that the plies may be wound into filter elements of complex shape. After steaming and after curing, the plies still retain a substantial amount of flexibility.

Of prime importance, where the filter is to be used in the filtration of oils, is the degree of cure achieved in the starch-resin mixture after drying of the web. If the cure is insufficient, the starch-resin mixture will have a substantial percentage of hot water extractable materials. The ply adhesion between adjacent plies of the filter structure will also be relatively low. However, if the impregnated plies are treated at a temperature in the range from 250 to 300° F. for times ranging from about 10 minutes to one hour, the hot water extractable content will be substantially decreased and the ply adhesion usually increased. Obviously, longer times will be used with lower temperatures and vice versa.

The effect of different curing times on the characteristics is illustrated in the following table illustrating the results obtained with a six-ply wadding material containing about 35 per cent by weight of a starch-melamine resin composition, the curing being carried out at a temperature of 280° F. The hot water solubility was based upon the acetone extraction method for determining phenolic compounds, ASTM D494–41, modified to use water only as a solvent. The results follow:

| Time of Cure, Minutes | Tensile, Lbs./3″ Width | | Caliper, Mils | Hot Water Solubility | | Ply Adhesion, Grs./3″ Width |
| --- | --- | --- | --- | --- | --- | --- |
| | M. D. | C. M. | | Percent of Starch Resin | Percent of Total | |
| 0 | 16.35 | 23.60 | 35.1 | 35.0 | 10.54 | 250 |
| 2 | 16.78 | 27.15 | 35.9 | 31.0 | 9.34 | |
| 5 | 16.21 | 26.75 | 36.4 | 25.2 | 7.70 | 270 |
| 10 | 19.01 | 24.80 | 35.9 | 13.6 | 4.06 | 270 |
| 30 | 18.80 | 27.75 | 34.5 | 1.6 | 0.46 | 320 |

For the best oil filter elements, the hot water extractable content should not be in excess of 4 per cent by weight of the product, and is preferably substantially below 1 per cent by weight. The ply adhesion for sheets of this type is excellent and may range from about 20 grams per inch of width at low concentrations to 70 grams and above at concentrations of about 30 per cent by weight. The curing characteristics of the resin-starch combination as well as the flow characteristics depend to a large extent upon the pH of the impregnating composition. For products of the melamine resin-starch type, this pH should be in the range from about 4.0 to 9.0. In the preferred product, the range is from 6.8 to 8.2 and the pH may be brought within this range by the addition of suitable buffers and accelerators.

The webs treated in accordance with the method described above can be used in the manufacture of many different types of filters, for example, convolutely wound filters or filters of the extended area type.

The multi-ply products of the present invention make good filter media because they combine good strength characteristics with improved porosity. This combination of features may be attributed to the way in which the starch-resin bonding agent locks the individual plies of the filter together. It appears that the bonding agent becomes distributed along the contacting areas between the adjacent plies to provide a large number of small bonding areas between the plies, i. e., at the peaks of the crepes, with a lesser amount of the bonding agent appearing on other areas of the constituent plies. This type of bond provides adequate resistance to delamination while not interfering substantially with either the flexibility or the porosity characteristics of the multi-ply creped product.

The filters described previously are particularly suitable for treating petroleum oils. Other filter products can be produced from the compositions mentioned for the filtration of air and other gases. For this type of filter, it is unnecessary to cure the impregnant to the degree specified for oil filters, for as an air filter, it is usually sufficient to merely dry the impregnated web at a temperature of about 200° F. for a few minutes until the moisture content is reduced at least to a value of 8 to 15 per cent by weight on an air dry basis.

While the foregoing discussion has been primarily concerned with the manufacture of filters, it should be recognized that the products of the present invention are also available for use in other applications where a porous, flexible sheet material is required.

Many modifications can be made in the above-described processes and product without departing from the scope of the present invention.

I claim:

1. A filter medium comprising a plurality of superposed sheets of thin, creped, cellulosic tissue bonded together with a cured reaction product of a melamine-aldehyde resin and modified starch, said reaction product comprising 1 part by weight of resin to 3 to 8 parts by weight of starch, said reaction product having a sufficient degree of cure so that the filter medium has a hot water extractables content of less than 4 per cent by weight, and said reaction product constituting from 10 to 40 per cent by weight of said filter medium.

2. A filter medium comprising a plurality of superposed sheets of thin, creped, cellulosic tissue bonded together with a cured reaction product of a carbamide-aldehyde condensation product and modified starch, said reaction product comprising 1 part by weight of resin to 3 to 8 parts by weight of starch, said reaction product having a sufficient degree of cure so that the filter medium has a hot water extractables content of less than 1 per cent by weight, and said reaction product constituting from 10 to 40 per cent by weight of said filter medium.

3. A filter medium comprising a plurality of superposed sheets of thin, creped, cellulosic tissue bonded together with a reaction product between a melamine-formaldehyde resin and modified starch, said reaction product comprising 1 part by weight of resin to 3 to 8 parts by weight of starch, said reaction product having sufficient degree of cure so that the filter medium has a hot water extractables content of less than 1 per cent by weight, and said reaction product constituting from 10 to 40 per cent by weight of said filter medium.

References Cited in the file of this patent

UNITED STATES PATENTS

| | | |
| --- | --- | --- |
| 2,322,887 | Schwartz et al. | June 29, 1943 |
| 2,385,438 | Fowler et al. | Sept. 25, 1945 |
| 2,554,814 | Catlin | May 29, 1951 |
| 2,576,864 | Valente | Nov. 27, 1951 |
| 2,600,845 | Carrigan | June 17, 1952 |
| 2,607,494 | Valente et al. | Aug. 19, 1952 |